(12) United States Patent
Wendt

(10) Patent No.: US 6,352,141 B1
(45) Date of Patent: Mar. 5, 2002

(54) BAINITICALLY HARDENED BRAKE DISK

(76) Inventor: Florian Wendt, Poststrasse 9, Freiberg (DE)

( * ) Notice: Subject to any disclaimer, the term of this patent is extended or adjusted under 35 U.S.C. 154(b) by 0 days.

(21) Appl. No.: 09/555,470
(22) PCT Filed: Nov. 26, 1998
(86) PCT No.: PCT/DE98/03507
  § 371 Date: May 30, 2000
  § 102(e) Date: May 30, 2000
(87) PCT Pub. No.: WO99/28641
  PCT Pub. Date: Jun. 10, 1999

(30) Foreign Application Priority Data

Nov. 29, 1997 (DE) .......................................... 197 53 116

(51) Int. Cl.$^7$ ................................................ C21D 5/02
(52) U.S. Cl. ................................ 188/218 XL; 148/612
(58) Field of Search ...................... 188/218 XL, 218 R; 148/612, 614

(56) References Cited

U.S. PATENT DOCUMENTS 5,603,784 A * 2/1997 Bay

FOREIGN PATENT DOCUMENTS

| EP | 0074624 | * | 3/1983 |
| EP | 02138527 | * | 5/1990 |

OTHER PUBLICATIONS

XP–002104028 by Kovaks & Keough pp. 16–2, No. 3 1994.*

* cited by examiner

Primary Examiner—Matthew C. Graham
(74) Attorney, Agent, or Firm—George W. Neuner, Esq.; Dike, Bronstein, Roberts & Cushman, IP Group of Edwards & Angell, LLP

(57) ABSTRACT

The invention relates to a bainitically hardened brake disk comprising at least one ring-shaped cast disk (1) body with radially extending ring sections in contact with brake shoes (2). Said brake disk is mounted on the hub of a bicycle wheel (5) for braking purposes. In order to avoid noise emissions and vibrations, the inventive disk is made of cast iron, is highly tough and has a low weight. The aim is to avoid the disadvantages of combining disk brakes with an aluminium wheel hub. The inventive disk is characterized in that it has a thoroughly bainitically hardened body (1) made of cast iron with lamellar graphite (AGI), the brake disk is designed as a single piece and is linked to the wheel hub (5) through composite casting by forming a positive material fitting joint (15) in the area where the hub (5) is connected to the base (3) of the disk.

5 Claims, 4 Drawing Sheets

BAINITICALLY HARDENED BRAKE DISK

Figure 1:
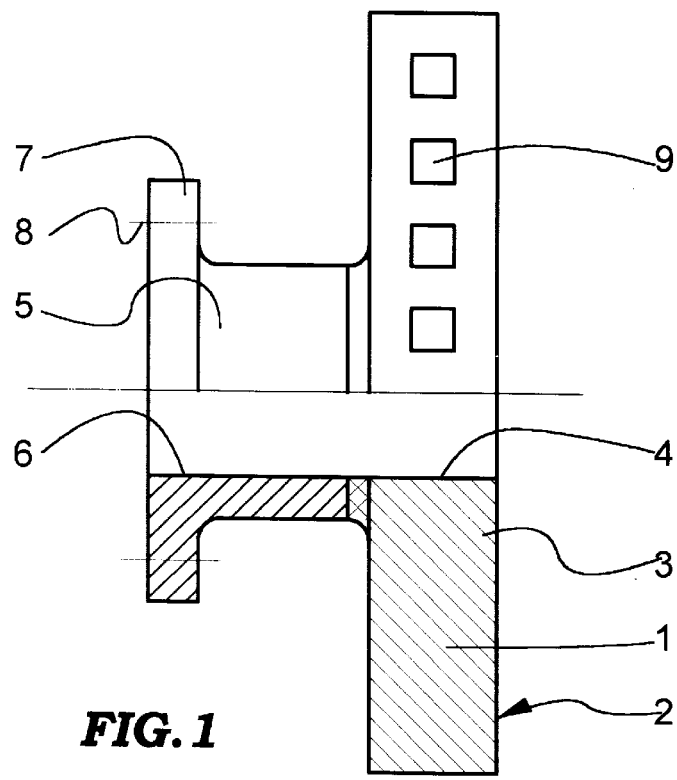

The invention relates to a bainitically hardened brake disk comprising at least one ring-shaped cast disk body with a radially extending ring section in contact with brake shoes mounted on a wheel hub together with a vehicle wheel for braking purposes.

Wheels of motor vehicles as a rule consist of a wheel body with a rim and base for the tire, and a dimensionally stable bowl which is centrally held to the flange of a wheel hub by bolts. The hub provides the bearing for the wheel and is itself mounted on the front or rear axle. A brake drum or disk of a disk brake assembly are detachably mounted on the wheel hub for braking the vehicle wheels. Disk brakes, which have now become accepted in modern cars, give a high braking effect while causing considerable wear. As a result, the worn brake disks of a motor vehicle need to be replaced several times during its lifetime. For easy replacement without dismantling the wheel hub, the same flange on the hub serves to fasten the wheel bowl and brake disk, requiring hat-shaped mounts and brake cups on the disk which account for a significant part of the weight of the brake assembly.

To facilitate the dismantling of disk brake assemblies, split brake disks have been proposed in which a worn friction ring can be separately replaced. DE 195 28 434 A1 describes a disk consisting of a friction ring, pin-shaped links and hubshaped bearing part. The links are held to the bearing part by a clamping ring and wheel bolts. The brake disk as a whole consists of the bearing part, an internally ventilated friction ring, and five links centered by a locating ring. As the links are made of different materials, not all of the advantages which would result from the use of castings manifest themselves.

As a solution to engineering problems encountered in manufacturing a brake disk described in DE 195 22 677 C1 which consists of a flat ring and is attached to the wheel hub, it is proposed to use an aluminum hub. This is again held by at least five bolts engaging recesses provided in the brake disk, said bolts being hollow to save weight. The bolts are knurled along part of their circumference and form-fitted into holes in the hub. It is well known that form-fitted links are highly sensitive to temperature and thus need to be protected from excessive heating. In an aluminum hub, the brake disk should therefore be mounted on the hub in a floating manner so that the heat generated by breaking may not be transferred from the brake disk to the hub. This type of floating arrangement is to guarantee optimal thermal insulation between the brake disk and wheel hub.

In view of the temperature sensitivity of aluminum, car manufacturers have made enormous efforts to replace aluminum components by gray iron castings. Of particular importance are the heat resistance properties of automotive components subjected to elevated temperatures. Here cast iron is superior to aluminum in that it has greater mechanical and fatigue strength at higher temperatures, and is highly resistant to hot cracking and more rigid while still offering good heat conductivity. Cast iron in particular provides good damping mainly because its microstructure contains graphite, an effect which also depends on the type of graphite interacting with the metallic matrix. This makes cast iron brake components particularly vibration damping and convenient.

Brake disks with flat separate friction rings made of cast iron for motor vehicle brakes may vary in construction. The publicly distributed printed copy of the application for DE 42 37 372 describes a brake disk consisting of at least three ring-shaped disk portions arranged side by side and joined to a pot-shaped disk carrier by intermittently arranged rivets. The outer disk portions are one-piece gray iron castings while the inner portions are laminated from at least two stacked sheet metal parts in order to dampen brake noise and squealing.

The publicly distributed printed copy of the application for DE 43 33 517 describes a brake disk consisting of a cast iron disk rim and form-fitted inner pot made of suitable steel sheet. The inner pot and disk rim are to be joined by laser welding without a filler thus giving a composite part with an inner pot characterized by higher tensile strength. According to the publicly distributed printed copy of the application for DE 195 05 112, the cast iron friction ring may be form-fitted in the direction of rotation with the pot-shaped holder provided for attachment to the vehicle wheel in such a way as to permit slight shifting parallel to the axis. The holder and friction ring have meandering indentations between which a meandering metal strip is inserted. During casting, the insert prevents the holder and friction ring from fusing together. This is to prevent warping of the disk from its plane as a result of braking or high temperatures, which may cause rubbing of the brake.

According to the patent specification for DE 34 32 501 C2, brake disks in rail vehicles exposed to even higher loads with a risk of cracking due to thermal stress are provided with radial slots at a uniform angular pitch to accommodate deformation from expansion during braking or thermal expansion. These arrangements may not suffice for disk brakes on high-speed trains where the large number and considerable weight of conventional brake disks made of gray and ductile iron, or cast steel, makes their use problematic. The solution proposed in the patent specification for DE 44 00 896 is a monobloc disk composed of a wear-resistant aluminum-silicon base alloy. This has the drawback of stiffening elements inserted into the cast structure which may increase production costs so that the approach is not applicable to conventional motor vehicle brake assemblies. Another disadvantage for use in road vehicles is less heat resistance at higher temperatures, for example when going downhill slowly with no cooling from the airflow.

For the above-mentioned reasons, high-strength cast iron grades have been suggested for use in heavy-duty vehicle brake disks. These are known as acicular ductile cast iron or, in the Anglo-Saxon terminology, as Austempered Ductile Iron (ADI). A well-known method for making ductile iron is to add small amounts of Mg to the melt, which produces nodular graphite to increase strength and toughness. Austempering has proven to be the most efficient procedure for further improving these properties.

In this connection, U.S. patent specification 5603 784 describes a method for producing brake drums and brake disk rings which are subject to premature wear from asbestos-free brake shoes and brake pads of disk brakes. It proposes rotatable brake components made of cast gray iron as particularly suitable for heavy duty trucks. The first step is providing a cast gray iron brake drum or disk with a carbon content between 3.4% and 4%. This is followed by an austempering heat treatment step which involves heating to between 816° C. and 927° C. and maintaining this temperature, and then quenching in a liquid bath at a temperature between 149° C. and 371° C. for 2–4 hours. The third step is retempering to provide a microstructure which consists of spheroidized pearlite carbon in a matrix of bainitic and austenitic iron. Brake disks made by this process have excellent wear resistance.

Brake disks made with a continuous bainitic or bainitic-austenitic microstructure throughout have the disadvantage of being less suitable for machining processes such as drilling, and a distortion caused by bainitic treatment. In addition, ductile iron does not have the desirable damping capacity of gray cast iron.

To avoid sound emission and vibration, the inventive brake disk is made of cast iron and has a high strength and low weight. The aim of the invention is particularly to avoid the disadvantages of combining a brake disk with a wheel hub made of aluminum.

According to the invention, the body of the brake disk is made of bainitically hardened gray cast iron (AGI) throughout. Bainitizing considerably improves the properties of gray cast iron, imparting very high strength, high wear resistance and an extraordinary damping capacity superior to that of a brake disk made of ductile iron. The microstructure of bainitic gray cast iron provides a wear resistance which is superior to that of high-strength gray cast iron, vermicular cast iron, and as-cast ductile iron. Even though these advantages have been listed for brake components by B. Kovacs in *Konstruieren und Gießen,* vol. 19 (1994), no. 3, p. 16 ff., it has so far been impossible to use brake disks of this type. The reason is that their damping capacity derives from the high internal stress generated by small grain sizes and low bainitizing temperatures, which may lead to stress cracks from machining operations such as drilling or threading. This excludes a frictional connection between the brake disk and hub.

In order to overcome these disadvantages, it is further proposed to produce a one-piece brake disk by composite casting of the wheel hub and disk body with a material connection in the joining region, wherein the wheel hub material is cast iron, cast steel or formed steel of a higher tensile strength greater than 170 N/mm$^2$. Composite casting provides a high-strength brake disk without the engineering problems caused by drilling and threading the hardened microstructure.

This enables the production of a high-strength and wear-resistant brake disk with a disk body whose service life is at least equal to, or longer, than that of the wheel hub. Eliminating the brake pot may, in other words, considerably reduce the weight of the brake disk so that it may be designed to give a useful life which, supposing average wear, is exactly the same as that of the motor vehicle. Regarding maintenance of the brake assembly, considerable cost advantages would result for the vehicle owner as there would be no need for brake disk replacement. The construction of the brake assembly and the method of bearing for the wheel could be improved and optimized. Considerable advantages could result for specific types of motor vehicles whose annual mileage is low, such as city cars.

The composite casting process for a bainitically hardened brake disk involves a first step in which a ring-shaped raw disk is cast from a gray iron melt in a mold. This is followed by casting on a wheel hub made of ductile iron to produce a composite casting which is dressed, balanced, bainitically hardened and then finished by grinding the disk portion. In a further development of the procedure, casting on a raw disk to a steel sheet hub inserted into a mold produces a raw brake disk in which the hub, due to its different chemical composition and microstructure, is excluded from bainitic hardening and thus retains its high tensile strength and toughness compared with the disk body.

Figure 3:
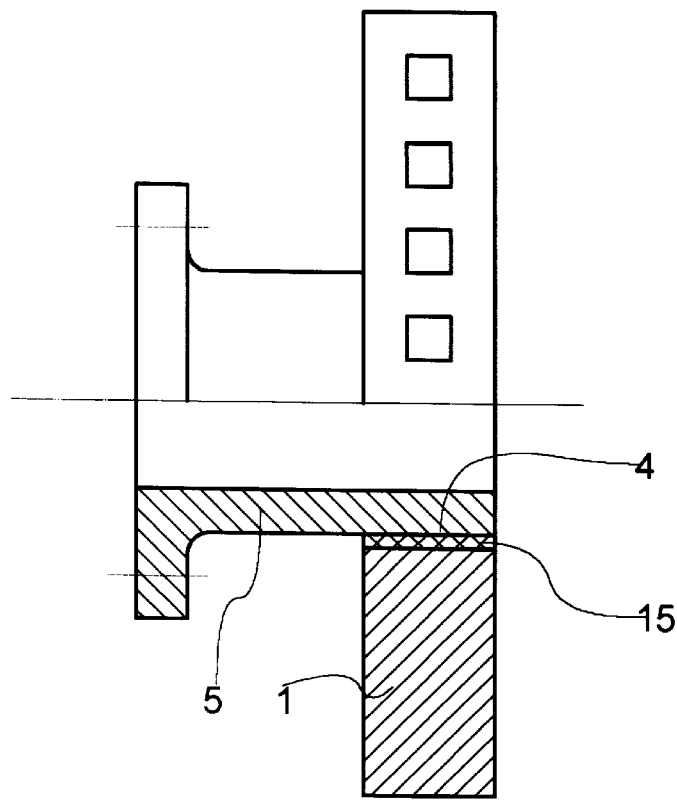
Figure 4:
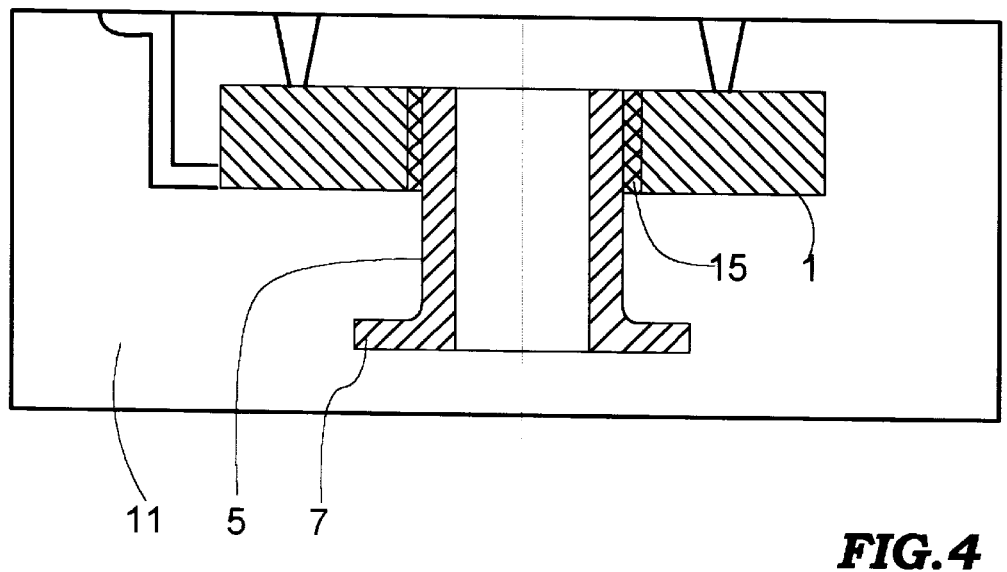
Figure 4A:
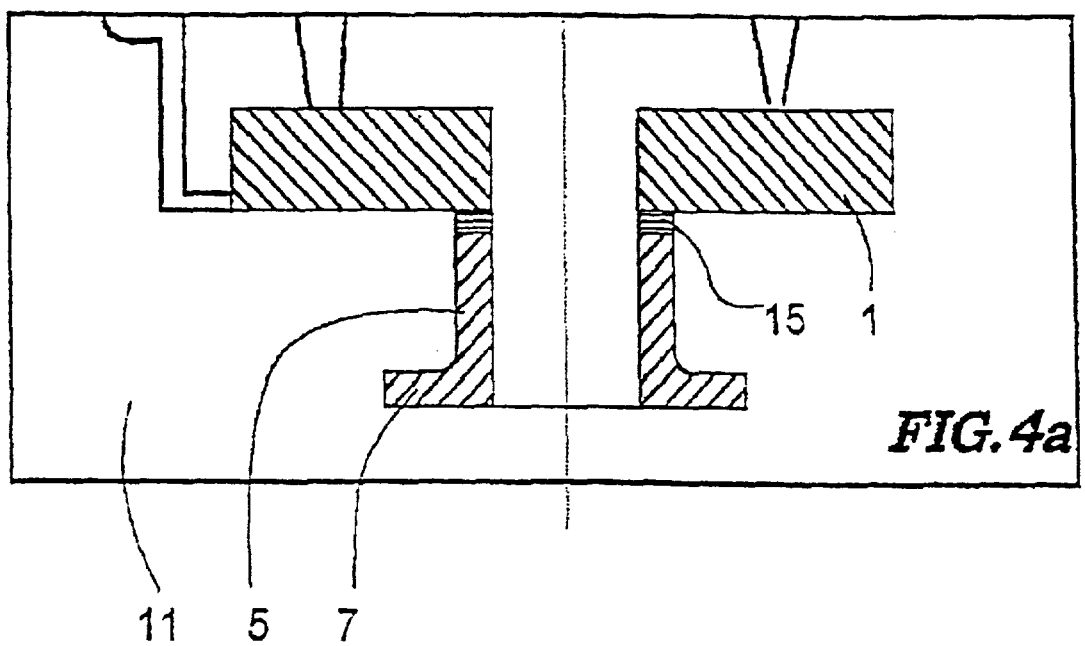
Figure 5:
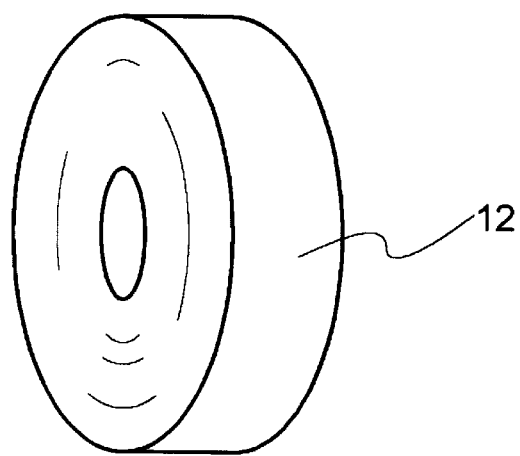
Figure 6:
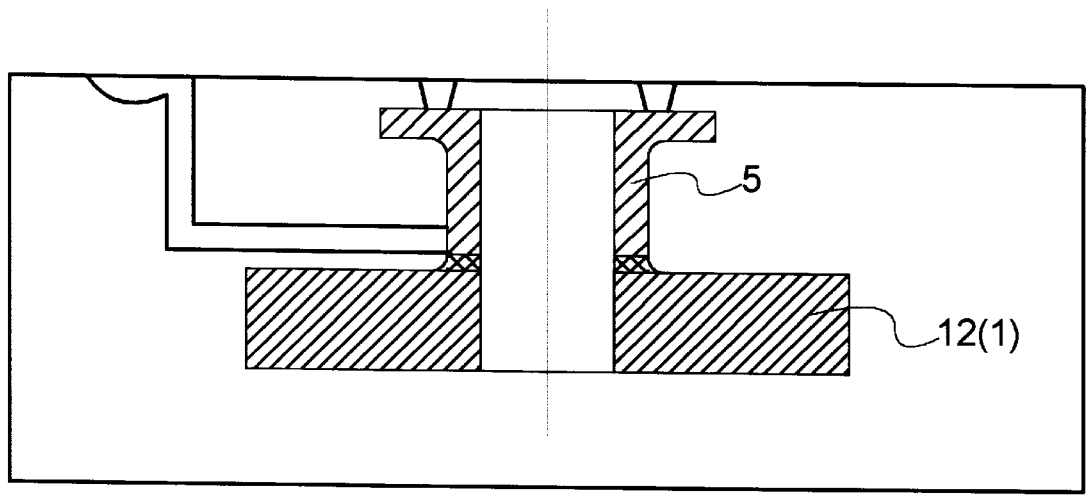

The invention further enables producing a bainitically hardened brake disk with an unhardened wheel hub made of nodular graphite, after preparation by dressing and balancing, by bainitic hardening of a raw disk cast from gray iron, followed by selective heating of the joining region at the hub, insertion into a mold, and composite casting by casting on the wheel hub made of nodular graphite. Cost-effective machining of the hub by drilling or threading is then possible, as shown in the following practical examples and accompanying drawings, where FIG. 1 is a brake disk with a bainitically hardened body and cast-on wheel hub made of bainitically hardened ductile cast iron, FIG. 2 is the mold for composite casting as illustrated in FIG. 1, FIG. 3 is a brake disk with a wheel hub made of steel sheet, FIG. 4 is a mold for the composite casting of the brake disk illustrated in FIG. 3, and FIG. 4a is a technologically improved version of FIG. 4, FIG. 5 is a hardened brake disk body for composite casting with an unhardened wheel hub made of nodular graphite, and FIG. 6 is a diagrammatic view of a mold for composite casting of the brake disk according to FIG. 5.

The disk for disk brakes shown in FIG. 1 consists of a ring-shaped disk body 1 with an external radial friction ring section 2 in contact with brake shoes, and an internal radial brake disk base 3 with a through bore 4 for the wheel hub. The hub 5 is provided with a truly aligned hole 6 for accommodating a front axle steering pin or rear axle drive shaft, both of them not specified in greater detail. While the brake disk body 1 is arranged on the inside of the vehicle, the outside of the wheel hub 5 accommodates the hub flange 7 with screw-down holes 8 for mounting the wheel bowl.

After manufacture, the friction ring section 2 of the disk body 1 is surface ground on both sides, which requires a certain machining allowance. In between the surface-ground friction ring sections 2, the brake disk body 1 may be hollow with ventilation ducts 9 as required, supplied from ventilation holes in the brake disk base 3 which are not specified in greater detail. In the joining region, the brake disk base 3 is connected to the wheel hub 5 by webs in accordance with accepted engineering standards.

Figure 2:
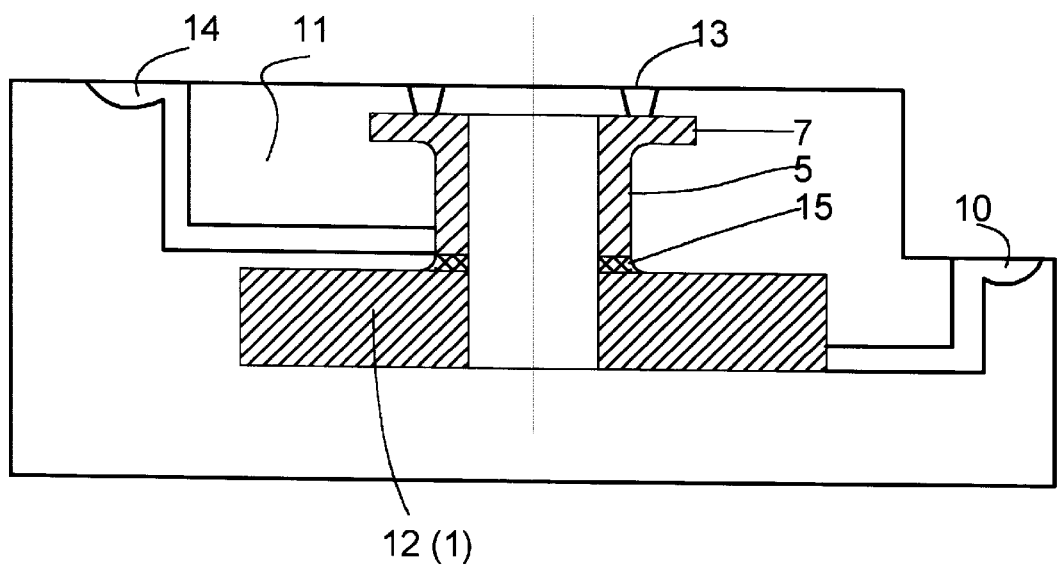

Producing a bainitically hardened brake disk in a composite casting process according to FIG. 2 starts by casting a ring-shaped raw disk 12 from a gray iron melt in a mold 11, with a core for ventilation ducts where appropriate.

Accordingly, the mold cavity for the raw disk 12 or disk body 1 is filled with a first gray iron melt through gate 10, followed by cooling of the melt until the cast iron material at the joining point is in the two-phase region. Then a mix of non-metallic materials consisting mainly of a boronic compound is introduced through the feeder 13 which is suitable to form a 0.5–1.5 mm thick coat on the exposed surface of the disk body 1 to dissolve oxides formed in the cooling process and avoid further oxidation by preventing the penetration of oxygen to the surface. The mix of non-metallic materials may possibly consist of 54% $Na_2B_4O_7$, 38% $B_2O_3$, 4% $K_2ZrF_6$ and 4% $SiO_2$. When the mix of non-metallic materials has spread over the surface and taken effect, the second melt for producing the wheel hub 5 and the hub flange 7 is poured through gate 14. This melt is to consist of ductile iron with a tensile strength greater than 170 N/mm$^2$. The pouring temperature of the second melt, and the temperature to which the disk body 1 is allowed to cool, should be such as to produce an equalization temperature at the joining point 15 which is at least 10° C. above the solidus temperature of one of the cast-iron materials for the disk body 1 or wheel hub 5 for a sufficiently long period.

This means that the pouring temperature of the second melt and the temperature of the body in the mold cavity should be adjusted to meet these conditions, making allowance for the particular geometric shape and thermal properties of the disk body 1 cast-iron material—wheel hub 5 cast-iron material—molding material system.

When pouring the cast-iron material for the wheel hub 5, the mix of non-metallic materials is displaced from the joining point 15 and, because its density is less than that of the melt, floats up to feeder 13. This produces a faultless joining point 15 between the disk body 1 and wheel hub 5 which guarantees safe transmission of the forces and moments resulting from braking and heating even if the cross section of wheel hub 5 were reduced.

After ejection, cooling and the removal of molding sand, the composite casting is roughly pretreated by dressing and balancing. Dressing enables economic production with a relatively large rate of cut and sufficient tool life. Greater machining allowances are needed as the surface quality and dimensional accuracy are inferior to aluminum casting, due to the high pouring and solidification temperatures of cast iron which stress the mold. This requires machining as-cast before hardening the brake disk.

Bainitic hardening is a multistage treatment in which the dressed and balanced raw disk is first heated to an annealing temperature of 780° C.–950° C. and, within a specified period, austenitized in the twophase region at this transformation temperature. A second annealing stage involves bainitizing over 1–3 hours at an intermediate temperature of 240° C.–450° C., followed by quenching in water or oil.

The resulting bainite enables producing a brake disk with unusual strength and wear-resistance from unalloyed or low-alloyed gray and ductile iron. It forms at lower temperatures during the intermediate treatment described above and imparts hardness and high strength to the material while making it less tough. Upper bainite produced in the higher temperature region gives less strength and hardness but still has high wear resistance and good toughness. This means that a brake disk with mechanical properties as required can be produced by varying the intermediate heat treatment temperatures, annealing time and chemical composition of the cast iron. In a composite brake disk cast from gray and ductile iron the tensile strength of the wheel hub 5 normally takes precedence over the wear resistance of the friction ring section 2, meaning that the bainitic hardening of the wheel hub 5 is aimed at a tensile strength greater than 170 N/mm$^2$. Less wear-resistant brake disks can be better machined by grinding after bainitic hardening to remove the distortion caused by bainitizing.

A wheel hub 5 made of steel sheet according to FIG. 5 is used to make a brake disk with a very high hardness and high wear resistance. The brake disk shown in FIG. 3 is produced by composite casting using a mold 11 shown in FIG. 4 into which the prefabricated wheel hub 5 with hub flange 7 is inserted and cast with the melt for the disk body 1. To obtain good quality and material connection at joining point 15, reference is made for the description of the procedure to the production of a wheel hub 5 made of gray iron as described above. Prior to pouring the melt and/or insertion into the mold 11, the wheel hub 5 should be heated and the pouring temperature should be such as to produce an equalization temperature at the joining point 15 which is at least 10° C. above the solidus temperature. Composite casting thus produces the disk body 1 in one piece with a material connection to the wheel hub 5 at joining point 15. FIG. 4a shows a technologically improved version of FIG. 4.

The composite as-cast raw brake disk may be machined by dressing and then balanced, followed by bainitic hardening and finish grinding. Bainitic hardening may use a lower intermediate treatment temperature to produce a very hard friction ring section 2 with a high wear resistance and a service life at least equal to, or longer, than the life of the wheel hub 5. This enables manufacture of a brake disk whose useful life, supposing comparably average wear, is the same or longer than that of the motor vehicle. These advantages derive essentially from the fact that a material which is excluded from bainitic hardening may be selected for the wheel hub 5.

A further method of producing a hardened brake disk in which only the disk body 1 consists of acicular gray iron (AGI) hardened throughout is to cast a wheel hub 5 from a melt on to a raw disk 12 as shown in FIG. 5, which has been bainitically hardened, surfaced and balanced. Prior to composite casting, the raw disk 12 made of gray iron is subjected to bainitic hardening and then selectively heated, for example by induction, in the joining region of wheel hub 5, inserted into a mold 11 as shown in FIG. 6 or, alternatively, selectively heated while in the mold, followed by casting on the wheel hub 5 made of ductile iron. This provides a brake disk in which the wheel hub 5 can be machined in the as-cast condition. The machining allowance for grinding the disk body 1 may then be reduced because the distortion from bainitizing is less without the cast-on wheel hub 5.

What is claimed is:

1. A bainitically hardened brake disk for use in connection with brake shoes, mounted together with a vehicle wheel on a wheel hub for braking purposes, said bainitically hardened brake disk comprising at least one ring-shaped cast disk body with an external radial friction ring section for contact with said brake shoes,
   the brake disk having a body that is bainitically hardened throughout and that consists of austempered lamellar graphite gray iron (AGI),
   wherein the brake disk is made in one piece, and
   wherein the disk body is connected to the wheel hub by composite casting, thereby forming a material connection point in the region where the wheel hub joins the brake disk,
   wherein a temperature of the brake disk at the material connection point is adjusted to a temperature which is at least 10° C. above the solidus temperature prior to the composite casting with the wheel hub, after coating the joining point, which is exposed for the composite casting, with a non-metallic mix of materials consisting of a reductive and anti-oxidizing boronic compound.

2. A bainitically hardened brake disk as defined in claim 1, wherein the wheel hub is made from a material selected from cast iron, cast steel or formed steel and has a tensile strength greater than 170 N/mm$^2$.

3. A method for producing a bainitically hardened brake disk, which comprises (i) at least one ring-shaped cast disk body with an external radial friction ring section for contact with brake shoes, mounted together with a vehicle wheel on a wheel hub for braking purposes and (ii) a joining point formed in a composite casting process in the joining region between the wheel hub and the brake disk base, the method comprising:
   a) casting a ring-shaped raw disk from a lamellar graphite gray iron melt in a mold,
   b) adjusting a temperature at the joining point in the joining region between the wheel hub and the brake disk base to a temperature which is at least 10° C. above the solidus temperature prior to casting,
   c) coating the joining point, which is exposed for casting, with a non-metallic mix of materials consisting of a reductive and anti-oxidizing boronic compound, d) composite casting a wheel hub of ductile iron onto the brake disk, e) rough-machining the brake disk by turning and balancing, f) bainitically hardening the brake disk, and g) finishing the brake disk.

4. A method for producing a bainitically hardened brake disk, which comprises (i) at least one ring-shaped cast disk body with an external radial friction ring section in contact with brake shoes, mounted together with a vehicle wheel on a wheel hub for braking purposes and (ii) a joining point forming in a composite casting process in the joining region between the wheel hub and the brake disk base, the method comprising:

a) inserting a wheel hub manufactured from steel sheet into a mold, b) coating the joining point exposed for casting on with a non-metallic mix of materials consisting of a reductive and anti-oxidizing boronic compound, c) adjusting a temperature of the joining point in the joining region between the wheel hub and the brake disk base to a temperature which is at least 10° C. above the solidus temperature prior to casting on, d) composite casting onto the wheel hub a ring-shaped raw disk made of lamellar graphite gray iron, e) machining the raw brake disk by turning and balancing, f) bainitically hardening the brake disk, and g) finishing the brake disk by remachining.

5. A method for producing a bainitically hardened brake disk, which comprises (i) at least one ring-shaped cast disk body with an external radial friction ring section in contact with brake shoes, mounted together with a vehicle wheel on a wheel hub for braking purposes and (ii) a joining point forming in a composite casting process in the joining region between the wheel hub and the brake disk base, the method comprising:

a) subjecting a raw disk cast from lamellar graphite gray iron to bainitic hardening after machining by turning and balancing, b) exposing the joining point for casting on a wheel hub and coating the joining point with a non-metallic mix of materials consisting of a reductive and anti-oxidizing boronic compound, c) inserting the raw disk cast from lamellar graphite gray iron into a mold, c) prior to casting on the joining point, the temperature of the joining region between the wheel hub and the brake disk base is adjusted by selective heating to a temperature which is at least 10° C. above the solidus temperature, d) composite casting onto the raw disk a wheel hub made from unhardened ductile vermicular graphite cast iron, and e) finishing the brake disk by remachining.

* * * * *